United States Patent
Kothari et al.

(10) Patent No.: US 8,782,314 B2
(45) Date of Patent: Jul. 15, 2014

(54) SCALABLE AND CONFIGURABLE SYSTEM ON A CHIP INTERRUPT CONTROLLER

(75) Inventors: Love Kothari, Sunnyvale, CA (US); Mark Fullerton, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 249 days.

(21) Appl. No.: 13/249,057

(22) Filed: Sep. 29, 2011

(65) Prior Publication Data

US 2013/0046915 A1     Feb. 21, 2013

Related U.S. Application Data

(60) Provisional application No. 61/524,538, filed on Aug. 17, 2011.

(51) Int. Cl.
*G06F 13/24* (2006.01)
*G06F 13/00* (2006.01)
*G06F 1/00* (2006.01)

(52) U.S. Cl.
USPC ............................ 710/260; 710/317; 713/300

(58) Field of Classification Search
USPC .................. 710/260, 317; 713/300
See application file for complete search history.

(56) References Cited

U.S. PATENT DOCUMENTS

| | | | |
|---|---|---|---|
| 6,192,439 B1* | 2/2001 | Grunewald et al. | 710/260 |
| 6,877,057 B2* | 4/2005 | Alexander et al. | 710/263 |
| 8,239,708 B2* | 8/2012 | Park et al. | 714/30 |
| 2008/0126652 A1* | 5/2008 | Vembu et al. | 710/268 |
| 2009/0164739 A1* | 6/2009 | Harikumar et al. | 711/153 |
| 2012/0173782 A1* | 7/2012 | Frantz et al. | 710/267 |
| 2012/0311210 A1* | 12/2012 | Pullagoundapatti et al. | 710/110 |
| 2013/0007492 A1* | 1/2013 | Sokol et al. | 713/322 |

OTHER PUBLICATIONS

IBM, Multiprocessor interrupt controller data book, May 16, 2011, IBM, version 1.2.*

* cited by examiner

*Primary Examiner* — Paul R Myers
*Assistant Examiner* — Christopher a Daley
(74) *Attorney, Agent, or Firm* — Sterne, Kessler, Goldstein & Fox PLLC

(57) ABSTRACT

Embodiments include a system and method for an interrupt controller that propagates interrupts to a subsystem in a system-on-a-chip (SOC). Interrupts are provided to an interrupt controller that controls access of interrupts to a particular subsystem in the SOC that includes multiple subsystems. Each subsystem in the SOC generates multiple interrupts to other subsystems in the SOC. The interrupt controller processes multiple interrupts and generates an interrupt output. The interrupt output is then transmitted to a particular subsystem.

20 Claims, 6 Drawing Sheets

SCALABLE AND CONFIGURABLE SYSTEM ON A CHIP INTERRUPT CONTROLLER

CROSS REFERENCE TO RELATED PATENT APPLICATIONS

This patent application claims the benefit of U.S. Provisional Patent Application No. 61/524,538, filed Aug. 17, 2011, entitled "Power Management Unit," which is incorporated herein by reference in its entirety.

BACKGROUND OF THE INVENTION

1. Field of the Invention

The present invention is generally related to interrupt controllers on a semiconductor system-on-a-chip.

2. Background Art

In a system-on-a-chip (SOC) that includes multiple subsystems and mini-subsystems within subsystems, components have difficulty communicating among each other. For example, when a communication subsystem needs to communicate with a multimedia subsystem or an application subsystem needs to communicate to a communication subsystem, there is a need for an efficient communication mechanism between the subsystems.

A conventional SOC transmits interrupts between different subsystems using subsystem to subsystem wiring, where each wire carries an interrupt from one subsystem to another. However, subsystem to subsystem wiring is not an optimal solution when the SOC includes multiple subsystems, as the SOC may run out of available real-estate that may be used for wiring. Additionally, as subsystems on the SOC share components, such as peripherals and hardware accelerators additional wiring is required to propagate interrupts from those components.

Additionally, when an SOC includes power management techniques that conserve power, the SOC may cause some subsystems to enter a dormant state when they are not being used by the SOC. When a subsystem is dormant it does not receive and recognize interrupts.

Therefore, what is needed that is not conventionally available, is a scalable interrupt controller that receives and propagates interrupts from different subsystems within an SOC. What is also needed that is not conventionally available, is a scalable interrupt controller that allows multiple subsystems to transmit and receive interrupts among each other such that the number of metal traces in the SOC does not increase in proportion to increase of interrupt sources in subsystems that generate interrupts. What is also needed is an interrupt controller that wakes up dormant subsystems prior to those subsystems receiving interrupts.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art(s) to make and use the invention.

Figure 1:
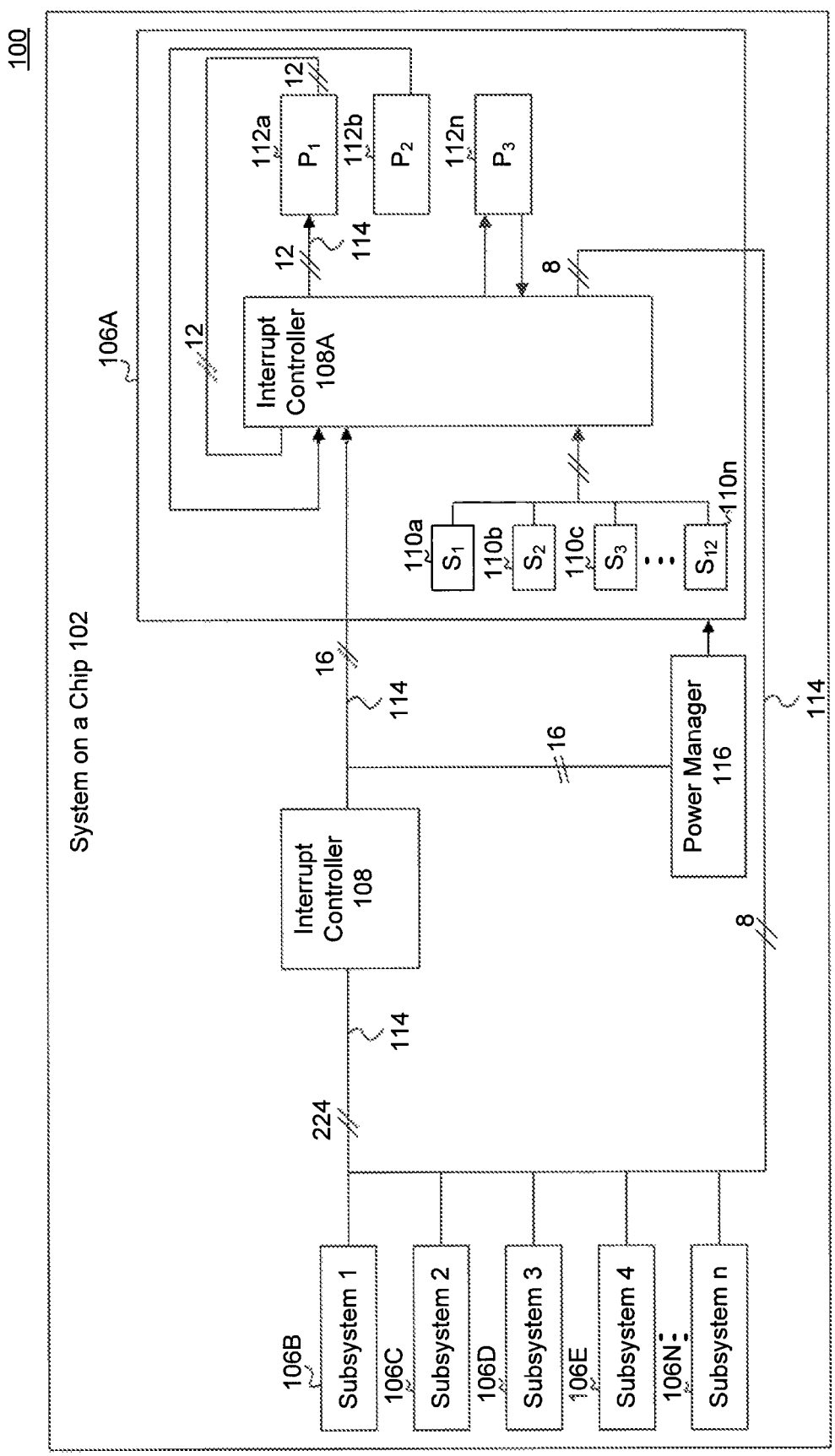
FIG. 1 is a block diagram of an exemplary system-on-a-chip (SOC).

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The embodiments of the invention include an interrupt controller that receives interrupts from multiple subsystems within a system-on-a-chip (SOC) and transmits interrupts to a particular subsystem. Embodiments of the invention also include an interrupt controller that receives interrupts from different mini-subsystems within the subsystem, and propagates interrupts to multiple mini-subsystems within the subsystem and to other subsystems in the SOC.

2. System Architecture

FIG. 1 is a block diagram 100 of a system-on-a-chip (SOC) environment, according to an embodiment. SOC 102 is an exemplary system-on-a-chip on a computing device. A computing device is an electronic device that receives computer instructions and processes computer logic. Example computer devices may include a server, a Web server, a mail server, a file server, print server, a database server, a desktop, a laptop, a mobile communication device such as a smartphone or a tablet computer, to name only a few.

SOC 102 includes multiple subsystems 106A-N. Example subsystems 106 may include a slave subsystem, a hub subsystem, a multimedia subsystem, a memory controller, a modem subsystem, an application subsystem, and a communication subsystem, to name only a few. Each subsystem 106 may include multiple components such as a processor, volatile and nonvolatile memory, a communication interface, mini-subsystems, mini-slave subsystems, etc. An example processor may include any conventional or special purpose processor, including, but not limited to, digital signal processor (DSP), field programmable gate array (FPGA), application specific integrated circuit (ASIC) and a graphics processing unit (GPU). Processor may be located within subsystem 106, a mini-subsystem 112, or a mini-slave subsystem 110.

When SOC 102 includes multiple subsystems 106, there is a need for subsystems 106 to communicate among each other. Typically, subsystems 106 generate interrupts for subsystem-to-subsystem communication. Interrupts interrupt processing on subsystem 106 and indicate to subsystem 106 that another subsystem 106 has sent a message and/or requires a service.

In a conventional SOC where multiple subsystems coexist, each subsystem may generate an interrupt to other subsystems in the SOC. The greater the number of subsystems, the greater the number of metal traces that run between different subsystems within the SOC. Those metal traces take up valuable real estate on the SOC. For example, the real-estate may be used for another subsystem, or the chip area may simply be reduced.

To limit the number of metal traces on SOC 102, SOC 102 includes an interrupt controller 108. Interrupt controller 108 receives interrupts from multiple subsystems 106 and propagates the interrupt to another subsystem 106. For example, referring to FIG. 1, interrupt controller 108 receives interrupts from multiple subsystems 106B-N and propagates the interrupt to another subsystem 106A. Interrupt controller 108 includes hardware logic for steering and muxing the interrupts such that the numbers of metal traces that carry interrupts between subsystems 106 is reduced. Interrupt controller 108 can be scaled to allow communication between multiple subsystems 106.

Interrupt controller 108 also sends signals to a power manager 116. Power manager 116 manages power consumption on SOC 102. To efficiently use power, power manager 116 places some subsystems 106 into a dormant state. A dormant subsystem 106, however, is unable to receive interrupts from interrupt controller 108 or from other subsystems 106. When power manager 116 receives a signal from interrupt controller 108, power manager 116 wakes up subsystem 106 before it receives interrupts from interrupt controller 108. For example, when power manager 116 receives a signal from interrupt controller 108, power manager 116 sends a signal to wake up a particular subsystem 106 prior to it receiving the interrupts.

In a non-limiting embodiment, interrupt controller 108 controls a flow of interrupts from subsystems 106B-N to an exemplary subsystem 106, such as subsystem 106A. Typically, interrupts are transmitted within SOC 102 using interrupt buses 114. Interrupt buses 114 include metal traces or another communication medium known to a person skilled in the art that carries an arbitrary number of interrupts. In a non-limiting example, interrupt bus 114 may carry 224 interrupts to interrupt controller 108 from subsystems 106B-N, and sixteen interrupts from interrupt controller 108 to subsystem 106A and to power manager 116. Interrupt buses 114 may also carry eight interrupts that were generated by interrupt controller 108A within subsystem 106A to subsystems 106B-N, and twelve interrupts from mini-subsystem "P1" 112A to interrupt controller 108A. A person skilled in the art will appreciate that the number of interrupts that interrupt buses 114 carry between various components may be defined by an SOC 102 designer.

Subsystem 106A may also receive dedicated interrupts. Dedicated interrupts are propagated to subsystem 106A and bypass the logic included in interrupt controller 108.

Subsystem 106A may also include a number of mini-subsystems 112a-n. Example mini-subsystems may include a digital signal processor (DSP), a WCDMA processor or other general purpose processors. A person skilled in the art will appreciate that other subsystems 106 may have similar and/or different components as subsystem 106A and may vary with each subsystem 106. Mini-subsystems 112 may receive interrupts from subsystems 106B-N that are external to subsystem 106A. Mini-subsystems 112 may also receive interrupts from other mini-subsystems 112 within subsystem 106A. Mini-subsystems 112 may generate interrupts for other mini-subsystems 112 within subsystem 106A or other components within SOC 102.

Figure 2:
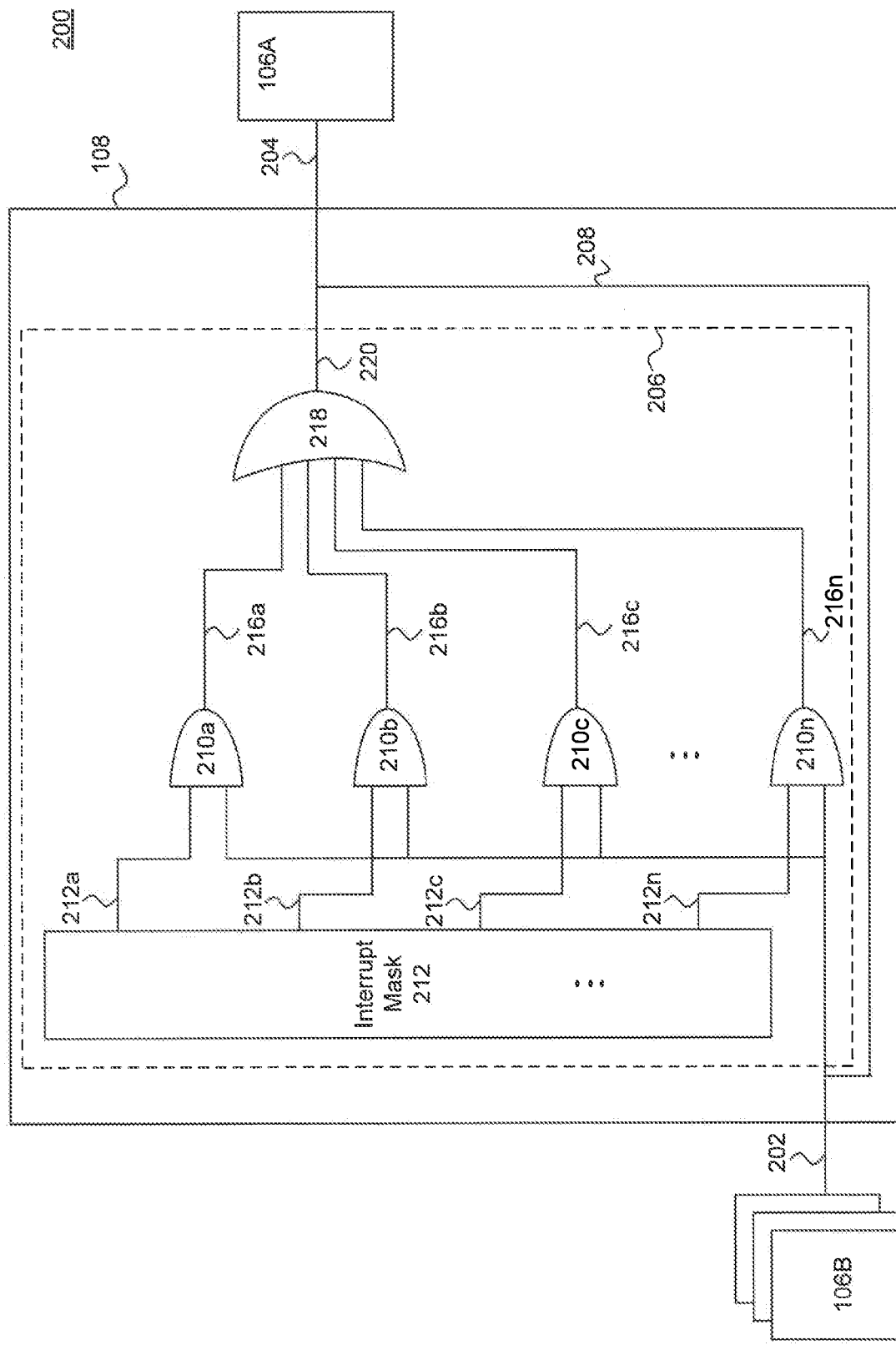
FIG. 2 is a block diagram of an interrupt controller processing interrupts from multiple subsystems on an SOC, according to an embodiment.

FIG. 2 is block diagram 200 of an exemplary embodiment of an interrupt controller. Interrupt controller 108 receives interrupt inputs using interrupt input bus 202 and propagates the interrupt output to subsystem 106A using interrupt output bus 204. Each interrupt input in interrupt input bus 202 may carry an interrupt from subsystems 106 in SOC 102. Interrupt controller 108 generates a subset of interrupt inputs from the interrupt inputs it receives using interrupt input bus 202. Interrupt controller 108 then propagates the generated subset as interrupt output 204 to subsystem 106A. Interrupt output 204 carries interrupts that represent an aggregated version of the interrupts carried by interrupt bus 202. For example, interrupt input bus 202 may be a bus that carries "N" number of interrupt inputs, and interrupt output bus 204 is also a bus that carries "M" number of interrupt outputs, where N>M.

Block diagram 200 includes an interrupt controller 108. Interrupt controller 108 includes one or more subsections 206. Each subsection 206 includes hardware logic that comprises a circuitry of "AND" gates 210 and "OR" gates 218. Each "AND" gate 206 in the subsection receives a first input from interrupt mask 212, and a second input from an interrupt input 202. Interrupt mask 212 is a predefined and programmable sequence mask bits that are "0" and "1", where the total number of mask bits is typically the same size as the maximum number of interrupts that may be propagated on interrupt input bus 202. Interrupt mask 212 uses the predefined sequence to identify an interrupt within interrupt input bus 202 that is to be examined by the particular "AND" gate 210.

When interrupt controller 108 receives interrupt input bus 202 that carriers "N" number of interrupt inputs from subsystems 206, interrupt controller 108 divides the interrupt inputs into a predetermined number of subsections 206. Although block diagram 200 includes a non-limiting embodiment with a single subsection 206, the number of subsections 206 that may be included in interrupt controller 108 may be controlled by SOC 102 designer.

Each "AND" gate receives an interrupt bit from interrupt input bus 202 and its corresponding mask bit from interrupt mask 212, so that the AND output 216 is a logic high ("1") only when both the interrupt bit is asserted ("1") and its corresponding mask bit is asserted ("1"); otherwise, "AND" gate 210 generates "AND" gate output 216="0" (also referred to as a "low" output). The interrupt mask 212 is predetermined and programmable at the SoC level. In this manner, only interrupts in interrupt bus 202 that are pre-selected by programming interrupt mask 212 are capable of being passed-on by the AND gates 210 to the following stage of processing. Those interrupts that are passed-on to the following stage may be referred to herein as "mask-identified interrupts", or simply "masked interrupts." In other words, masked interrupts are asserted interrupts that also have their corresponding mask 112 bit asserted, and so trigger a logic "1" from the respective AND gate 210.

Each "AND" gate output 216 that is generated by each "AND" gate 210 is aggregated using "OR" gate 218. "OR" gate 218 uses "AND" gate output 216 from "AND" gates 210 within each subsection 206 to generate an "OR" gate output 220. A high "OR" gate output 220, is an indication that at least one interrupt input that was propagated through section 206 included an asserted interrupt (i.e. logic "high"). "OR" gate outputs 220 from multiple subsections 206 are propagated to subsystem 206A using the interrupt output bus 204. In FIG. 2, interrupt output bus 204 includes sixteen lines (corresponding to sixteen subsections), though a person skilled in the relevant art may appreciate that any number of lines may be included in interrupt output bus 204.

In an embodiment, interrupt controller 108 may also include circuitry for the dedicated interrupts, such as dedicated interrupts 208. Dedicated interrupts 208 are interrupts that are important to a particular subsystem 106. Dedicated interrupts 208 are separated from interrupt input bus 202 and propagated to interrupt output bus 204 without being processed by the logic included in subsections 206. In other words, the dedicated interrupts bypass the interrupt logic of the subsections 206. Typically, a dedicated interrupt may be reserved for an interrupt that frequently interrupts a particular subsystem 106 or for an interrupt where a quicker response time may be required than for other interrupts.

In another embodiment, interrupt controller 108 includes a software override (not shown) that may generate an interrupt within interrupt controller 108. Typically, the software override may be connected to "AND" gate 210 in each subsection 206 instead of an interrupt input. The software may cause a high "AND" gate output 216 which may cause a high output on interrupt output bus 220. In an embodiment, the software override may create interrupts that are used to test functionality of interrupt controller 108 and to create inter-processor communication (IPC) interrupts, by causing a high output for specific "AND" gates 210 and "OR" gates 218.

Subsystem 106A receives the output interrupts 220 from multiple subsections 206 using interrupt output bus 204. Once subsystem 106A receives the interrupt using interrupt output bus 204 it passes the interrupt to a component within subsystem 106A, such as, for example, mini-subsystems 112, slave-subsystems 110 or interrupt controller 108A.

When mini-subsystems 112 within subsystem 206A receives an interrupt using interrupt output bus 204, subsystem 206A queries interrupt controller 108 to identify the particular interrupt(s) that were actually asserted in the interrupt input bus 202. This is necessary because of the aggregation hierarchy that is utilized in interrupt controller 108 to reduce the number of interrupt lines in the interrupt output 204. For example, interrupt controller 108 may identify subsection 206 that propagated a high output to interrupt output bus 204. Once interrupt controller 108 identifies subsection 206 that propagated the interrupt, interrupt controller 108 uses interrupt mask 212 to identify the particular interrupt(s) in interrupt input bus 202 that was asserted. Further, for dedicated interrupts, subsystem 106A propagates the dedicated interrupts to mini-subsystems 112 within subsystem 106 without querying interrupt controller 108.

Figure 3:
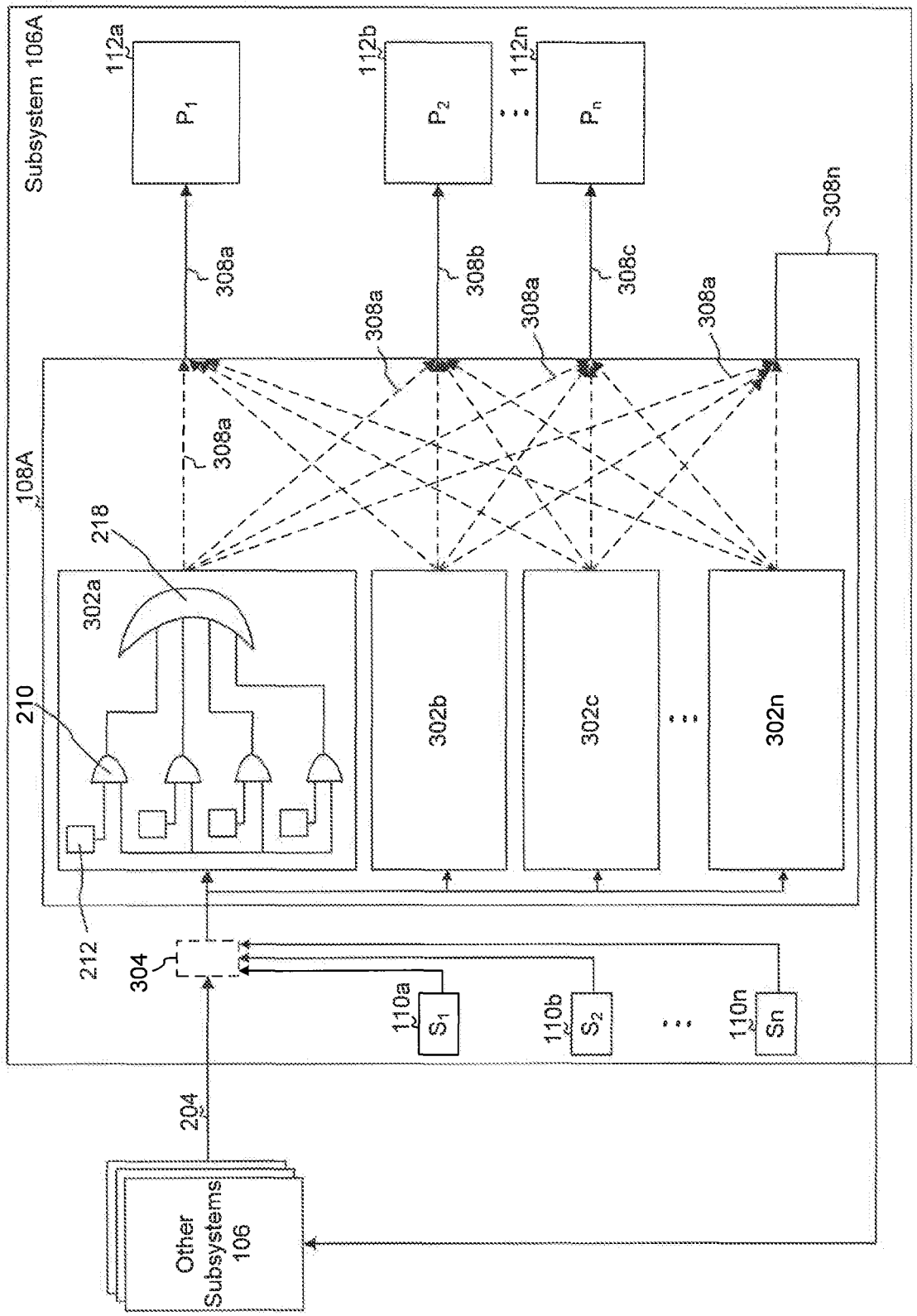
FIG. 3 is a block diagram of a subsystem processing internal and external interrupts, according to an embodiment.

FIG. 3 is a block diagram 300 of a subsystem processing internal and external interrupts, according to an embodiment. For example, subsystem 106A may receive internal and external interrupts. Internal interrupts are interrupts that subsystem 106A receives from mini-subsystems 112 and slave subsystems 110 that execute within subsystem 106A. External interrupts are interrupts that subsystem 106A receives from other subsystems 106 in SOC 102, using, for example, interrupt output bus 204.

Block diagram 300 includes, in a non-limiting embodiment, an interrupt controller 108A, mini-subsystems 112, and slave subsystems 110. Interrupt controller 108A receives interrupts from other subsystems 106, using for example interrupt output bus 204. Interrupt controller 108A may also receive internal interrupts from other components within subsystem, such as slave subsystems 110. As shown, the external interrupts on bus 204 are aggregated with the internal interrupts from internal subsystems 110, and sent to interrupt controller 108A as an aggregate interrupt bus 304. Interrupt controller 108A may also propagate interrupts to mini-subsystems 112, slave subsystems 110 and other subsystems 106 using interrupt output bus 308.

Interrupt controller 108A includes multiple subsections 302a-n. Each subsection 302 includes instruction logic that is similar to subsection 206 in FIG. 2. However, each subsection 302 may vary from subsection 206 in the number of "AND" gates 210 included in each subsection 302 and the size of each bit mask 212. Each subsection 302 may include logic that processes interrupt inputs from the aggregate bus 304, as discussed herein.

Each "AND" gate 210 included in subsection 302 includes interrupt inputs from the aggregate interrupt bus 304. "AND" gates 210 collectively operate on the interrupts from aggregate interrupt bus 304 in the manner described above with respect to FIG. 2, so as to only pass the interrupts pre-programmed in the interrupt masks 212. Specifically, each "AND" gate receives an interrupt bit from the aggregate interrupt bus 304, and its corresponding mask bit from an interrupt mask 212, so that the AND output 216 is a logic high ("1") only when both the interrupt bit is asserted ("1") and its corresponding mask bit is asserted ("1"); otherwise, "AND" gate 210 generates "AND" gate output 216="0" (also referred to as a "low" output). Those asserted interrupts that also have their corresponding mask bit 112 asserted are referred to herein as masked interrupts. Each section 302 aggregates the output of each "AND" gate 210 using "OR" gate 218. When the output of "OR" gate 218 is high, section 302 includes at least one interrupt that was asserted from the aggregate interrupt bus 304, and preselected by the appropriate interrupt mask 212.

When subsection 302 generates an interrupt output, the interrupt output is propagated to mini-subsections 112 or to other subsystems 106. After interrupts are propagated through subsections 302, interrupt controller 108A propagates the interrupt output of subsection 302 using metal traces. For example, output 308a that is generated using subsection 302a may be propagated to mini-subsystem 112 "P1", mini-subsystem 112 "P2", and including mini-subsystem 112 "Pn", as shown. Interrupt controller 108A may also propagate the interrupt to other subsystems 106 as shown in FIG. 3, using for example metal traces that carry output 308n.

Figure 4:
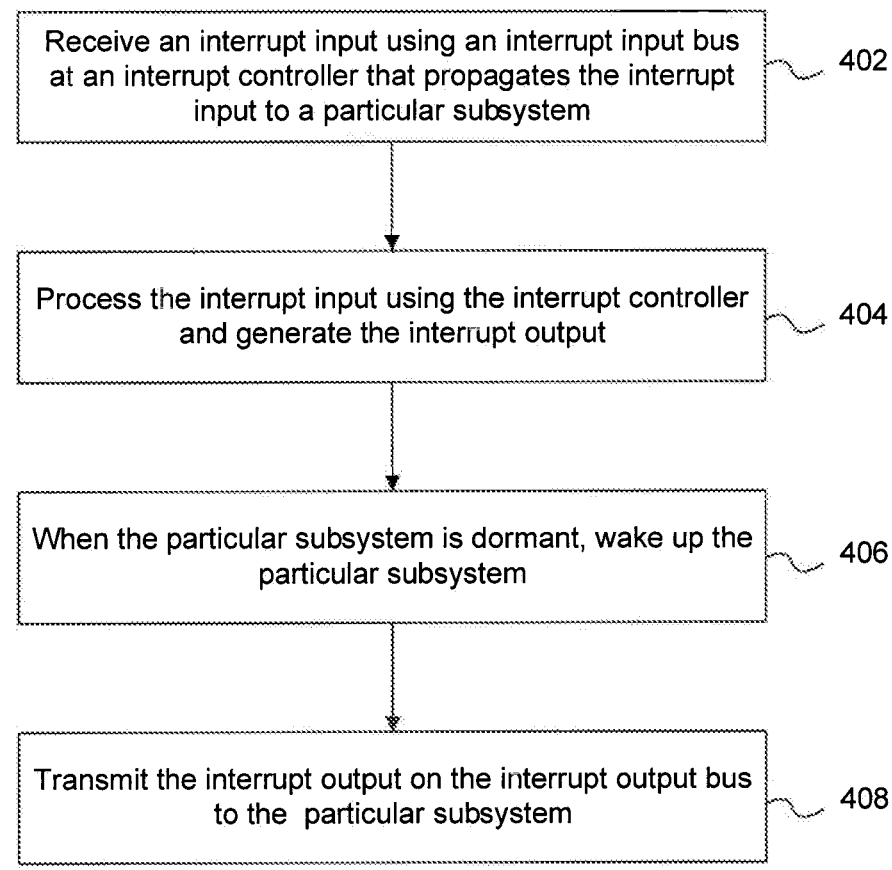
FIG. 4 is a flowchart of a method for processing interrupts, according to an embodiment.

FIG. 4 is a flowchart 400 of a method for processing interrupts, according to an embodiment.

At step 402, interrupts from multiple subsystems in an SOC are transmitted to an interrupt controller for a particular subsystem. For example, subsystems 106 transmit interrupts using an interrupt input bus 202 to interrupt controller 108 that is associated with a particular subsystem 106, such as, subsystem 106A. As described herein, interrupt controller 108 propagates interrupts from other subsystems 106 to subsystem 106A such that the amount of wires used to propagate interrupts on SOC 102 is reduced.

Figure 5:
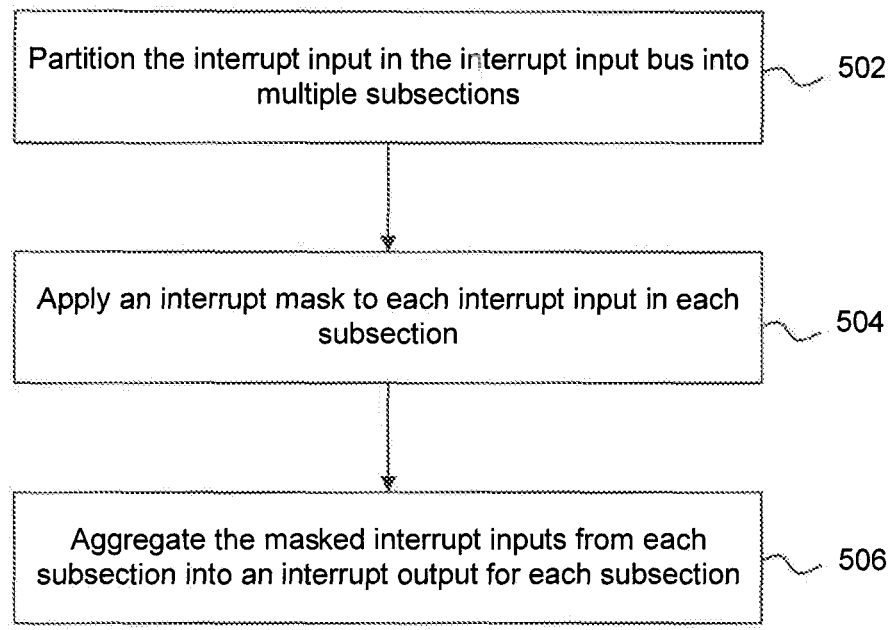
FIG. 5 is a flowchart of a method for processing interrupts within an interrupt controller, according to an embodiment.

At step 404, interrupts from multiple subsystems are processed. For example, interrupt controller 108 processes interrupts received using interrupt input bus 202 and generates an interrupt output that is propagated on interrupt output bus 204. FIG. 5, described below, includes a flowchart of an exemplary method for processing interrupts to generating an interrupt output.

At step 406, an interrupt controller ensures that a subsystem that receives interrupts is active. For example, to conserve power on SOC 102, power manager 116 may place some subsystems 106 into a dormant state. When subsystem 106 is in a dormant state, subsystem 106 may be unable to receive interrupts from other subsystems 106. Thus, when interrupt controller 108 receives an interrupt for a dormant subsystem 106, interrupt controller 108 sends a signal to power manager 116 to activate any dormant subsystem 106.

At step 408, an interrupt controller transmits the interrupt to a subsystem. For example, once interrupt controller 108 generates the interrupt output 204, interrupt controller 108 propagates interrupt output 204 to subsystem 106 that is associated with interrupt controller 108.

FIG. 5 is a flowchart of a method 500 for processing interrupts within an interrupt controller, according to an embodiment.

At step 502, interrupts in the interrupt input bus are partitioned. For example, interrupt controller 108 partitions the interrupt inputs in interrupt input bus 202 into multiple interrupt input sections. Each interrupt input section is routed to subsection 206 within interrupt controller 108 for processing.

At step 504, an interrupt mask is applied to each interrupt within each subsection. For example, each subsection 206 includes an "AND" gate 210. "AND" gate 210 may include two inputs, the first input being a selected interrupt input from the interrupt input section, and the second input being the corresponding mask bit from interrupt mask 212. Interrupt controller 108 uses an "AND" gate 210 logic to apply an interrupt mask 212 to an interrupt input in subsection 206 and generate AND gate output 216. When an interrupt input is asserted high and its corresponding interrupt mask 212 bit is also high, then "AND" gate 210 logic generates a high for "AND" gate output 216. As described herein, a high output indicates that an interrupt exists within the interrupt input that was routed to a particular section 206, and preselected by the corresponding mask 212.

At step 506, the masked interrupts are aggregated. For example, "AND" gate output 216 from each "AND" gate 210 is aggregated using an "OR" gate 218 logic. "OR" gate 218 logic produces an output interrupt 220. Output interrupt 220 is propagated to subsystem 106A using output bus 204.

Figure 6:
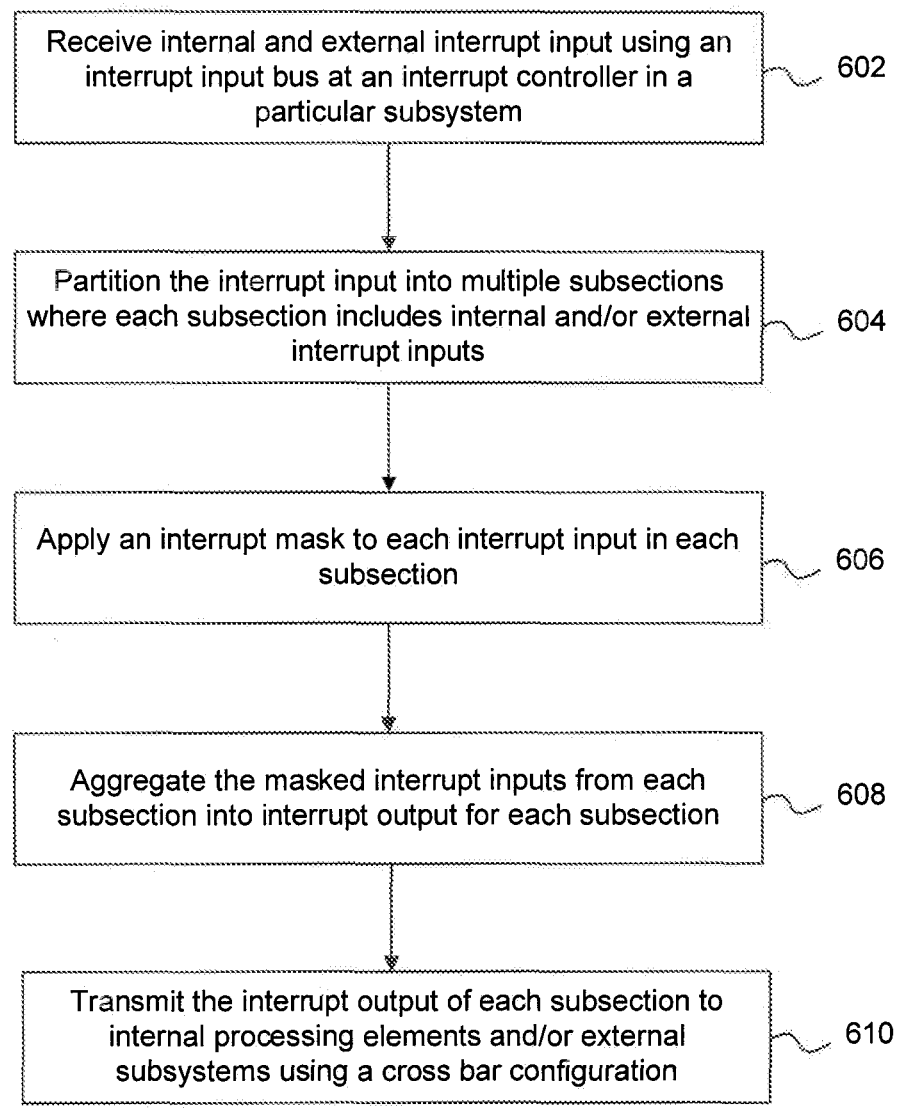
FIG. 6 is a flowchart of a method for processing interrupts within a subsystem, according to an embodiment.

FIG. 6 is a flowchart of a method 600 for processing interrupts within a subsystem, according to an embodiment.

At step 602, interrupts are transmitted to an interrupt controller located within a subsystem. For example, interrupt controller 108A receives interrupt inputs that are internal to subsystem 106A. Example internal interrupts may be received from mini-subsystems 112 and slave processors 110. Interrupt controller 108A also receives external interrupt inputs, using, for example, external interrupt input 204. Example external interrupts may be received from interrupt controller 108 or be dedicated interrupts from other subsystems 106. The internal and external interrupts are aggregated to form an aggregate interrupt bus 304 that provides an interrupt input to the interrupt controller.

At step 604, interrupts are partitioned for processing. For example, interrupts are partitioned for processing using multiple subsections 302. As described herein, each subsection 302 includes "AND" gates 210 that receive a particular interrupt input and interrupt input mask 112. "AND" gate 210 may include an interrupt input from the aggregate interrupt bus 304, as shown in FIG. 3.

At step 606, an interrupt mask is applied to each interrupt within a subsection. For example, interrupt mask 212 is combined with a selected interrupt input from the aggregate interrupt bus 304. When the position of interrupt in the aggregate interrupt bus 304 matches the position of interrupt mask 212, "AND" gate 210 produces a "high" output, as described herein.

At step 608, the masked interrupts are aggregated into an interrupt output. The output generated by each "AND" gate 210 described in step 606 is passed to "OR" gate 218. The "OR" gate 218 aggregates the interrupt output of each "AND" gate 210 into an interrupt output produced by subsection 302.

At step 610, interrupt output from each subsection is transmitted using a crossbar configuration. For example, when subsection 302 generates interrupt output 312, interrupt controller 108A propagates interrupt output 312 from each subsection 302 to, for example, mini-subsystems 312 or subsystems 106. For example, interrupt output 312a generated by subsection 302a is propagated to mini-subsystems "P1," "P2" through "Pn," and other subsystems 106 via interrupt bus 308.

3. Conclusion

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents

What is claimed is:

1. A method for propagating a plurality of interrupts to a subsystem in a system-on-a-chip (SOC), comprising:
   providing the plurality of interrupts to an interrupt controller, the interrupt controller controlling access of the plurality of interrupts to the subsystem on the SOC, the SOC including a plurality of subsystems that generate the plurality of interrupts;
   processing the plurality of interrupts using the interrupt controller to generate an interrupt output, wherein the processing further comprises:
      partitioning the plurality of interrupts for processing by a plurality of subsections within the interrupt controller;
      applying an interrupt mask to each interrupt within each subsection in the plurality of subsections, wherein the applying generates a masked interrupt from each interrupt; and
      aggregating each masked interrupt in each subsection with other masked interrupts in the same subsection into the interrupt output; and
   transmitting the interrupt output to the subsystem.

2. The method of claim 1, wherein the interrupt mask identifies logic within each subsection that processes the interrupt.

3. The method of claim 1, further comprising:
determining whether the subsystem is dormant; and
when the subsystem is dormant, waking up the subsystem prior to transmitting the interrupt output to the subsystem.

4. The method of claim 1, further comprising:
identifying a dedicated interrupt in the plurality of interrupts; and
routing the dedicated interrupt to the interrupt output, wherein the routing bypasses the processing using the interrupt controller.

5. The method of claim 1, further comprising:
generating an interrupt within the interrupt controller.

6. The method of claim 5, further comprising:
using the generated interrupt to test the processing in the interrupt controller.

7. A system for propagating a plurality of interrupts to a subsystem included on a system on a chip (SOC), comprising:
an interrupt controller including a plurality of subsections, the interrupt controller configured to:
receive the plurality of interrupts, the interrupt controller controlling access of the plurality of interrupts to the subsystem on the SOC, the SOC including a plurality of subsystems that generate the plurality of interrupts;
process the plurality of interrupts using the plurality of subsections to generate an interrupt output, wherein each subsection is configured to:
receive a subset of the plurality of interrupts;
apply an interrupt mask to each interrupt within the subset of interrupts to generate a masked interrupt for each interrupt; and
aggregate each masked interrupt within the subsection with other masked interrupts into the interrupt output; and
transmit the interrupt output to the subsystem.

8. The system of claim 7, wherein the interrupt mask identifies logic within each subsection that processes the interrupt.

9. The system of claim 7, further comprising a power source configured to:
determine whether the subsystem is dormant; and
when the subsystem is dormant, generate a signal to the subsystem, wherein the signal wakes up the subsystem prior to the interrupt controller transmitting the interrupt output to the subsystem.

10. The system of claim 7, wherein the interrupt controller is further configured to:
identify a dedicated interrupt in the plurality of interrupts; and
route the dedicated interrupt to the interrupt output, wherein the routing bypasses each subsection in the interrupt controller.

11. A method for propagating a plurality of interrupts within a subsystem included on a system on a chip (SOC), comprising:
providing the plurality of interrupts to an interrupt controller, the interrupt controller controlling access of the plurality of interrupts within the subsystem;
partitioning the plurality of interrupts for processing by a plurality of subsections within the interrupt controller;
applying an interrupt mask to each interrupt within each subsection in the plurality of subsections, wherein the applying generates a masked interrupt for each interrupt;
aggregating each masked interrupt in each subsection with the other masked interrupts in the same subsection into an interrupt output; and
using a cross-bar configuration to transmit the interrupt output of each subsection within the SOC.

12. The method of claim 11, wherein at least one interrupt in the plurality of interrupts is an internal interrupt.

13. The method of claim 11, wherein at least one interrupt in the plurality of interrupts is an external interrupt.

14. The method of claim 11, further comprising transmitting the interrupt output to another subsystem in the SOC.

15. The method of claim 11, further comprising transmitting the interrupt output to a mini-subsystem within the subsystem.

16. A system for propagating a plurality of interrupts within a subsystem in a system on a chip (SOC), comprising:
an interrupt controller configured to:
receive the plurality of interrupts within the subsystem;
partition the plurality of interrupts into a plurality of subsets for processing by a plurality of subsections within the interrupt controller, wherein each subsection within the plurality of subsections is configured to:
apply an interrupt mask to each interrupt within the interrupt subset to generate a masked interrupt for each interrupt; and
aggregate each masked interrupt in each subsection with the other masked interrupts in the same subsection into an interrupt output; and
use a cross-bar configuration to transmit the interrupt output of each subsection within the SOC.

17. The system of claim 16, wherein at least one interrupt in the plurality of interrupts is an internal interrupt.

18. The system of claim 16, wherein at least one interrupt in the plurality of interrupts is an external interrupt.

19. The system of claim 16, further comprising transmitting the interrupt output to another subsystem in the SOC.

20. The system of claim 16, further comprising transmitting the interrupt output to a mini-subsystem within the subsystem.

* * * * *